(12) United States Patent
Dubey et al.

(10) Patent No.: US 7,895,561 B2
(45) Date of Patent: *Feb. 22, 2011

(54) SYSTEM AND METHOD FOR TEXT BASED PLACEMENT ENGINE FOR CUSTOM CIRCUIT DESIGN

(75) Inventors: Sanjay Dubey, Austin, TX (US); Gaurav Mittal, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 505 days.

This patent is subject to a terminal disclaimer.

(21) Appl. No.: 11/970,787

(22) Filed: Jan. 8, 2008

(65) Prior Publication Data

US 2008/0098343 A1   Apr. 24, 2008

Related U.S. Application Data

(63) Continuation of application No. 11/109,100, filed on Apr. 19, 2005, now Pat. No. 7,353,478.

(51) Int. Cl.
*G06F 17/50* (2006.01)

(52) U.S. Cl. .................................. 716/119; 716/122
(58) Field of Classification Search ............... 716/7–12, 716/119, 122
See application file for complete search history.

(56) References Cited

U.S. PATENT DOCUMENTS

2006/0136856 A1 *  6/2006  Tang et al. ................. 716/11

\* cited by examiner

*Primary Examiner*—Paul Dinh
(74) *Attorney, Agent, or Firm*—VanLeeuwen & VanLeeuwen; Matthew W. Baca

(57) ABSTRACT

A system and method that uses a text-based script file to capture a circuit design and allows a circuit designer to manipulate the script file. The circuit designer can add, delete, or move components using various tags and commands that are stored in the script file. When the design is complete, or ready to be tested, the script file is processed creating a layout representation file that is readable by a graphics-based circuit design tool.

8 Claims, 5 Drawing Sheets

SYSTEM AND METHOD FOR TEXT BASED PLACEMENT ENGINE FOR CUSTOM CIRCUIT DESIGN

RELATED APPLICATIONS

This application is a continuation application of U.S. Non-Provisional patent application Ser. No. 11/109,100, entitled "System and Method for Text Based Placement Engine for Custom Circuit Design," filed on Apr. 19, 2005, now U.S. Pat. No. 7,353,478.

BACKGROUND OF THE INVENTION

1. Technical Field

The present invention relates in general to system and method for placing circuit components on a design layout. More particularly, the present invention relates to a system and method for processing a textual design script to place circuit components in a graphical design layout.

2. Description of the Related Art

Circuit designers use graphically based circuit design tools to place components on a hardware design layout. The visual depiction allows the circuit designer to see the components and how they interconnect with one another. The completed design can then be tested using a variety of tools before the layout is used to fabricate actual hardware.

Circuit and layout designers place components on a design layout using input means such as a mouse or a graphics tablet. The designer visually places components where the component will be installed in the circuit. For example, if a processor component is designed to utilize local memory, the processor and the local memory are placed proximate to each other. After components are placed, they are wired to each other. The circuit designer places the components using a specialized software application designed to graphically depict components. These components often allow the graphic design to be exported to a design language, such as VHDL, for use in fabricating the circuit. In addition, the software applications often include routing capabilities that allow the circuit designer to show how components are wired to each other as well as depict where the metal between components is routed.

While visual circuit design tools provide a valuable tool for circuit designers to view a circuit design before fabrication, working with large designs can be problematic, especially when changes are needed. When working with a graphic circuit design tool, many components may have to be moved in order to modify a design. For example, if an additional component is needed in the middle of a large design, the designer has to manually move components in order to create enough empty space in the middle to accommodate the additional component. A large design can include tens or even hundreds of components. Having to manually select and drag many of the components to new locations is both tedious and time consuming. In addition, errors in the design may be inadvertently introduced when components are moved.

What is needed, therefore, is a system and method that allows the designer to edit a textual file that describes component placement. Furthermore, what is needed is a system and method that converts the textual file into a format suitable to be read, and further manipulated, by the specialized graphics circuit-design software application.

SUMMARY

It has been discovered that the aforementioned challenges are resolved using a system and method that uses a text-based script file to capture a circuit design and allows the designer to manipulate the script file. The circuit designer can add, delete, or move components around using various tags and commands that are stored in the script file. When the design is complete, or ready to be tested, the script file is processed creating a layout representation file that is readable by a graphics-based circuit design tool.

The script file created by the designer indicates which components are proximate to one another without specifying actual dimensions of the various components. A separate data file, called a component library, includes information about the various components such as the components' physical dimensions. The system uses rows and columns to determine placement of components without specifying the width or height of the individual columns and rows. Instead, the system figures out the width and height based upon the size of the components placed in the various rows and columns. For example, if components placed in one row are larger, then its row height is greater than a row with smaller components. In this manner, the designer specifies which components are proximate to other components without manually placing the individual components. When the components have been placed, the system processes the script file and determines the actual placement using the component dimensions read from the component library. If an additional component is needed, the designer simply adds a reference to the additional component in the proximate location where it is needed. For example, if the additional component is needed on a row in between two other components, then a reference to the additional component is simply added in the appropriate place in the script file. Now, when the script file is processed, the additional component will appear on the graphic representation in the appropriate place.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
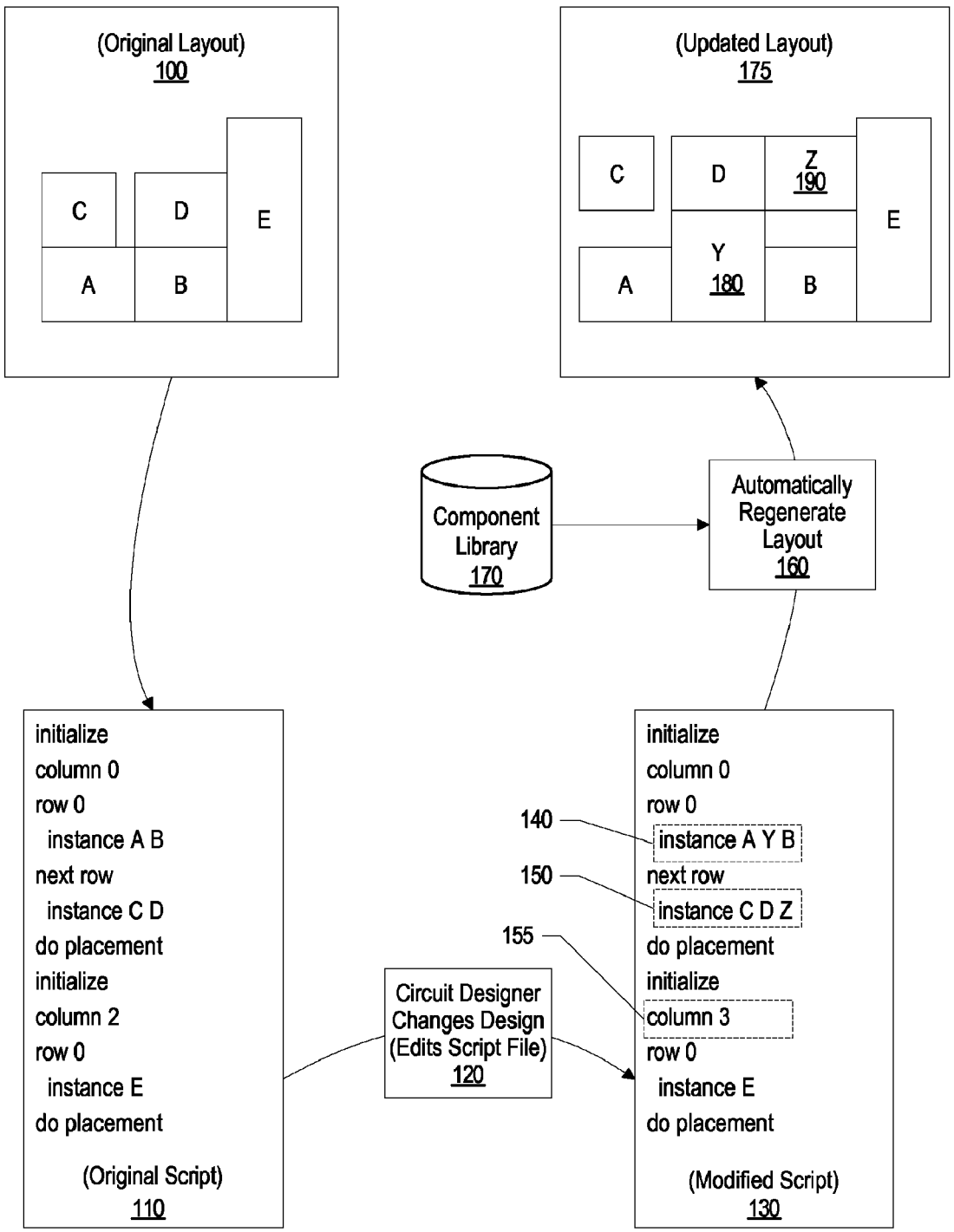
FIG. 1 shows a high-level diagram of a text-based file being used to modify a circuit design layout.

FIG. 1 shows a high-level diagram of a text-based file being used to modify a circuit design layout. Original layout 100 is a graphical depiction of components in a circuit design tool. In the example shown, original layout 100 includes five components—"A" through "E." The components occupy two rows and three columns. Components "A," "B," and "E" have been placed in the lower row (row 0), while components "C" and "D" have been placed in the higher row (row 1). Likewise, components "A" and "C" have been placed in the first column (column 0), components "B" and "D" have been placed in the next column (column 1), and component "E" has been placed in the last column (column 2). Text-based file 110 was used to create original layout 100. As used herein, the terms "text-based file" and "script file" are used interchangeably to refer to a text file, such as file 110, that is processed to create a circuit design layout, such as layout 100.

As will be appreciated by those skilled in the art, there may be tens, hundreds, or even thousands of components in a layout, such as layout 100. In the examples shown in FIG. 1, a limited number of components are used in order to better show the creation of the circuit design layout without complicating the layouts.

A discussion of text-based file 110 illustrates commands used to generate the circuit layout. The first command, "initialize," resets, or initializes, variables used to keep track of where components are placed. The next two commands, "column 0," and "row 0," sets the placement of the next placed components to the first column and row. The next command, "instance A B," places an instance of components "A" and "B" starting at the current column and row (i.e., starting at column 0, row 0). The next command, "next row," is used to move to the next row, in this case "row 1." The command "instance C D" places an instance of components "C" and "D" starting at the current column and row (i.e., starting at column 0, row 1). The "do placement" command is executed next to establish the actual placement of the instanced components, in this case components "A" through "D." Another "initialize" command is executed to reset the variables used to keep track of placement of components. The next two commands (column 2 and row 0) set the current position to the lowest row and the third column. The "instance E" command places component "E" in the position shown in layout 100. Because component "E" is taller than other components, by placing it in its own column, it is able to physically span both rows 0 and 1 used where components "A" through "D" were placed. The final "do placement" command establishes the actual position of component "E" as shown in layout 100.

In the example shown, the circuit designer has determined that two new components need to be added to the layout. In updated layout 170, these new components are labeled as components "Y" and "Z." Rather than using an input device, such as a mouse, to move components around to make room for components "Y" and "Z," the circuit designer instead modifies the script. As mentioned earlier, those of skill in the art will appreciate that actual circuit layouts may contain hundreds or even thousands of components. Having to move all of these components manually is tedious, time consuming, and may introduce component placement errors in the design. Instead, at step 120, the circuit designer edits the script file 110 and creates modified script file 130. In the example shown, component "Y" is added to row 0 between components "A" and "B" by modifying instance command 140 (i.e., "instance A B" is changed to "instance A Y B"). Likewise, component "Z" is added to row 1 after components "C" and "D" by modifying instance command 150 (i.e., "instance C D" is changed to "instance C D Z"). Finally, because a new column has been added to both row 0 and 1, column command 155 is updated to indicate that the "E" component is placed in the fourth column (column 3) rather than the third column (column 2).

At step 160, modified script file 130 is processed. Characteristics of the various instanced components ("A" through "E," "Y" and "Z") are retrieved from component library 170 that includes data regarding each of the components used in the design. Additionally, by storing component data in library file 170, changes to a particular component can be incorporated into a design by updating the library with the component's new characteristics and running the script file creating a new layout 175. Processing of modified script file 130 results in updated layout 175. As can be seen in updated layout 175, the components have been moved around so that new component "Y" is between "A" and "B" and component "Z" is after components "C" and "D." In addition, new component "Y" is taller than components "A" and "B," so the resulting first row (row 0) in updated layout 175 is taller than the first row of original layout 100. Likewise, if the shape of any of the other components was changed in component library 170 then the new attributes of the component would be retrieved and the component would appear with the updated characteristics in updated layout 175.

Figure 2:
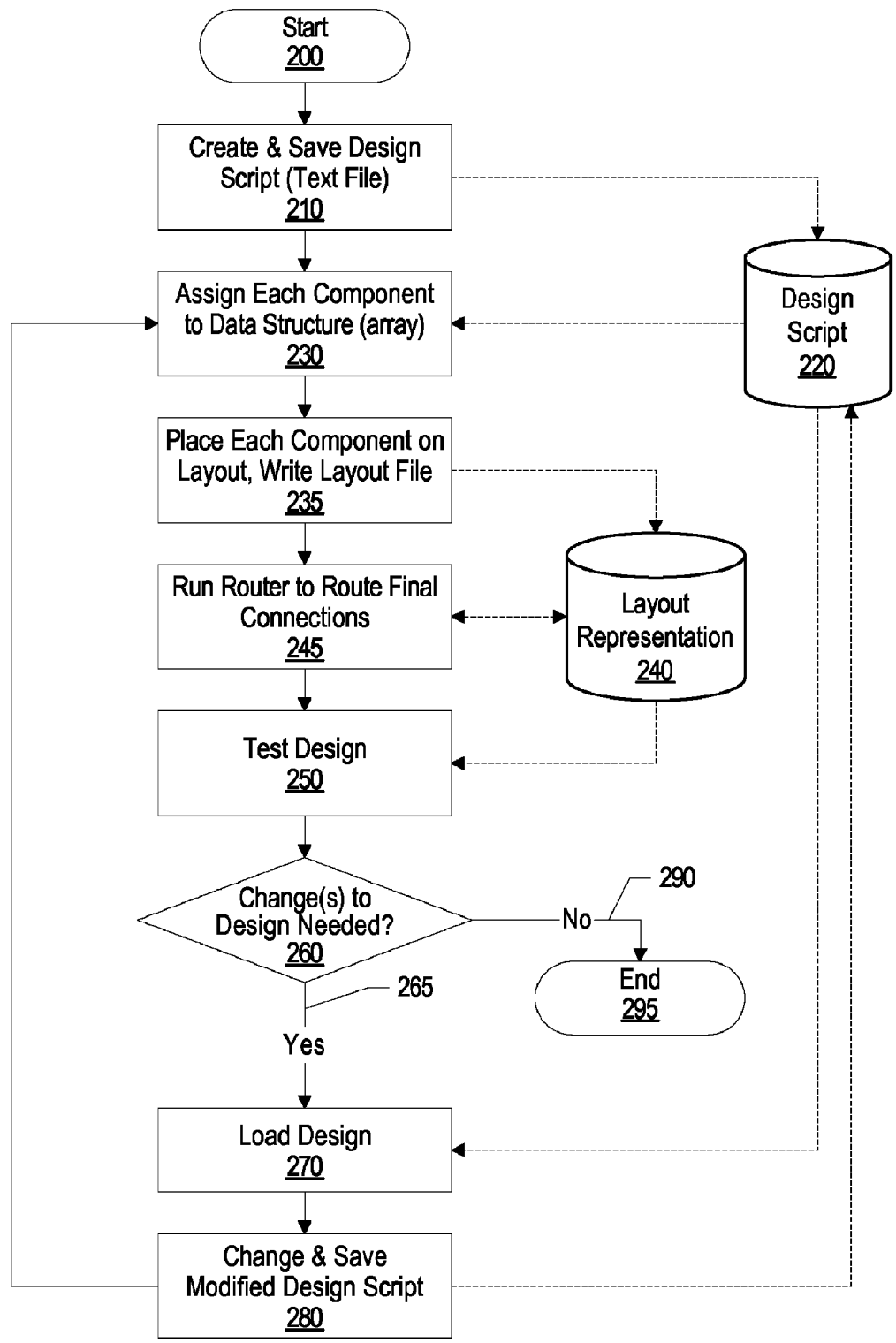
FIG. 2 is a flowchart showing the overall methodology used to create and modify a circuit design layout using a text-based file.

FIG. 2 is a flowchart showing the overall methodology used to create and modify a circuit design layout using a text-based file. Processing commences at 200 whereupon, at step 210, the circuit designer creates and saves design script 220. The commands included in design script 220 are similar to the commands shown in script files 110 and 175 in FIG. 1.

When the designer wishes to process the design into a graphical layout (viewable using traditional GUI-based circuit design tools), design script file 220 is processed. A detailed discussion of the steps taken to process design script 220 can be found in Appendix "A" of this detailed description. The embodiment shown in Appendix "A" is shown coded in the Perl programming language. Those of skill in the art will appreciate that many other programming languages can be used implement the teachings herein. Accordingly, the embodiment shown in Appendix "A" is provided as a non-limiting example of a preferred implementation.

During processing of the design script file, each instanced component is assigned to a data structure, such as an array structure (step 230). When each component has been written to the data structure, it is then placed on the layout and written to layout representation file 240 (step 235). Next, the components placed in the layout are routed to one another using either a manual or automated routing procedure (step 245).

The design, as contained in layout representation 240, is tested using any of a variety of techniques used to test circuit design layouts (step 250). A determination is made, based on the testing, as to whether changes are needed to the design (decision 260). If testing reveals that changes are needed to the design, decision 260 branches to "yes" branch 265 whereupon, at step 270, the current design script is loaded into a text editor or word processor and the design is altered to address the errors noted during testing and saved (step 280). Processing then loops back to recreate the graphical layout representation (file 240). This looping continues until no more changes are needed to the design, at which point decision 260 branches to "no" branch 290 and processing ends at 295.

Figure 3:
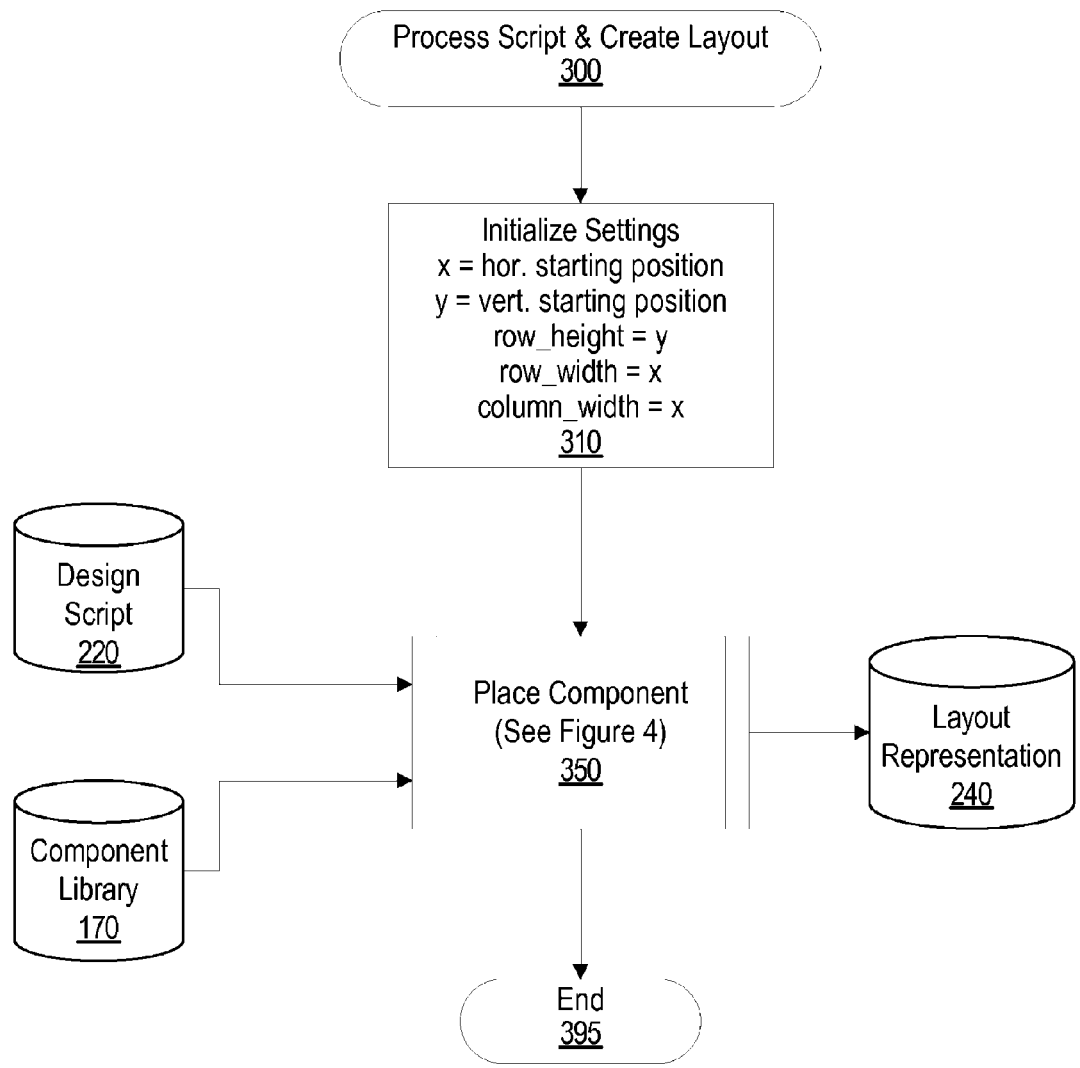
FIG. 3 is a high-level flowchart for processing the text-based file and creating a new circuit design layout.

FIG. 3 is a high-level flowchart for processing the text-based file and creating a new circuit design layout. Processing commences at 300 whereupon, at step 310, settings are initialized. These settings include setting the starting "x" coordinate to a horizontal starting position and setting the starting "y" coordinate to a vertical starting position. The current row height is initialized to the same value as the starting "y" coordinate value since no components have been added to the current row. When a component is added, the row height variable is used to keep track of the tallest component in the current row. Likewise, the current row width and column width is initialized to the same value as the starting "X" coordinate value since no components have been added to the current row. When a component is added, the row width variable is used to keep track of the width of the row and the column width variable is used to keep track of the width of the column (i.e., the widest component in a given column will determine the column width).

Figure 4:
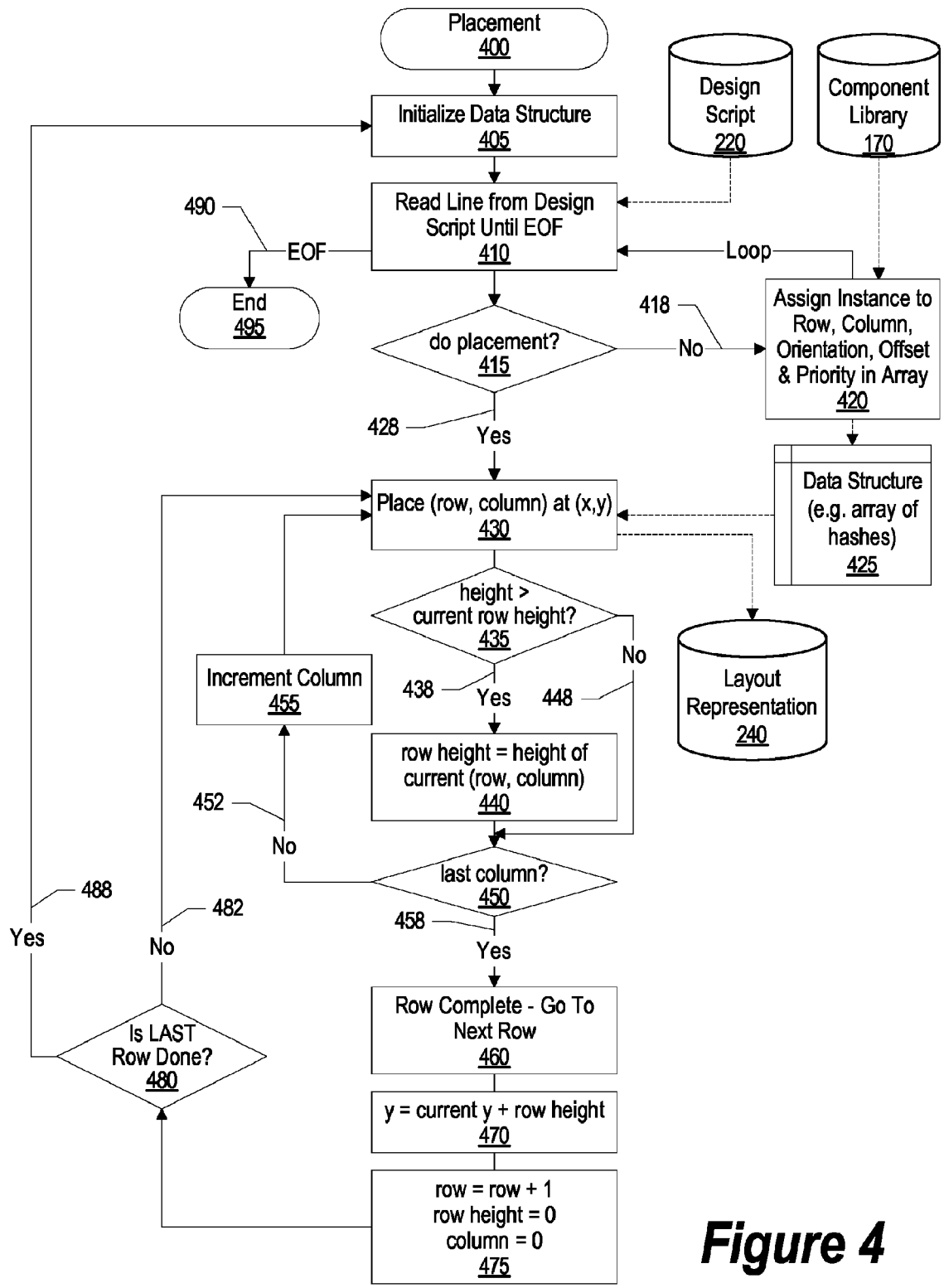
FIG. 4 is a flowchart showing the steps taken to place components in the circuit design layout based upon data processed in the text-based file.

After settings have been initialized, the components identified in design script 220 are processed using the physical characteristics of the components stored in component library 170 (predefined process 350, see FIG. 4 and corresponding text for processing details). The result of predefined process 350 is layout representation file 240 that is adapted to be read and processed by a traditional graphics-based circuit design and analysis tool. Processing thereafter ends at 395.

FIG. 4 is a flowchart showing the steps taken to place components in the circuit design layout based upon data processed in the text-based file. Processing commences at 400 whereupon, at step 405, the data structure used to store data regarding the instanced components is initialized. At step 410, a loop is commenced to begin reading design script 220 and end reading the file when an end of file (EOF) condition is encountered. The first line from design script file 220 is read and a determination is made as to whether a "do placement" command has been encountered (decision 415). If a "do placement" command has not been read, decision 415 branches to "no" branch 418 whereupon the component instance is assigned to a row, column, orientation, offset, and priority in the data structure (step 420). Processing then loops back to read the next line from the design script. This looping continues until either the end-of-file condition occurs or a "do placement" command is read.

If a "do placement" command is read, decision 415 branches to "yes" branch 428 whereupon, at step 430, the components that were stored in the data structure are placed starting at the current x and y coordinates. A determination is made as to whether the height of the component is greater than the current row height (decision 435). If the height of the component is greater than the current row height, then decision 435 branches to "yes" branch 438 whereupon the current row height is set to be equal to the height of the component (step 440). On the other hand, if the height of the current component is not greater than the current row height, then decision 435 branches to "no" branch 448, bypassing step 440.

A determination is made as to whether the last column has been processed (decision 450). If the last column has not yet been processed, decision 450 branches to "no" branch 452 whereupon, at step 455, the column is incremented, and processing loops back to process the component at the current row and column (after the column has been incremented). This looping continues until the last column of the current row has been processed, at which point decision 450 branches to "yes" branch 458. At this point, the current row is complete and processing moves to process the next row (step 460). The starting vertical position (y) is set to the current y value set during initialization plus the row height of the row that was just completed (step 470). At step 475, the row number is incremented, the current row height is reset to zero (since no components have yet been placed on the new row), and the column width is also reset to zero (again, since no components have yet been placed on the new row).

A determination is made as to whether the last row of the design currently stored in the data structure has been processed (decision 480). If the last row has not been processed, decision 480 branches to "no" branch 482 whereupon processing loops back to read the components from the data structure placed on the current row. On the other hand, if the last row of components currently stored in the data structure has been processed, decision 480 branches to "yes" branch 488 whereupon processing loops back to initialize the data structure and continue reading lines from the design script until either another "do placement" command is encountered or the end-of-file is reached on the design script. This looping continues until all "do placement" commands have been processed and the end of file condition is reached, at which point branch 490 is taken and processing ends at 495.

Figure 5:
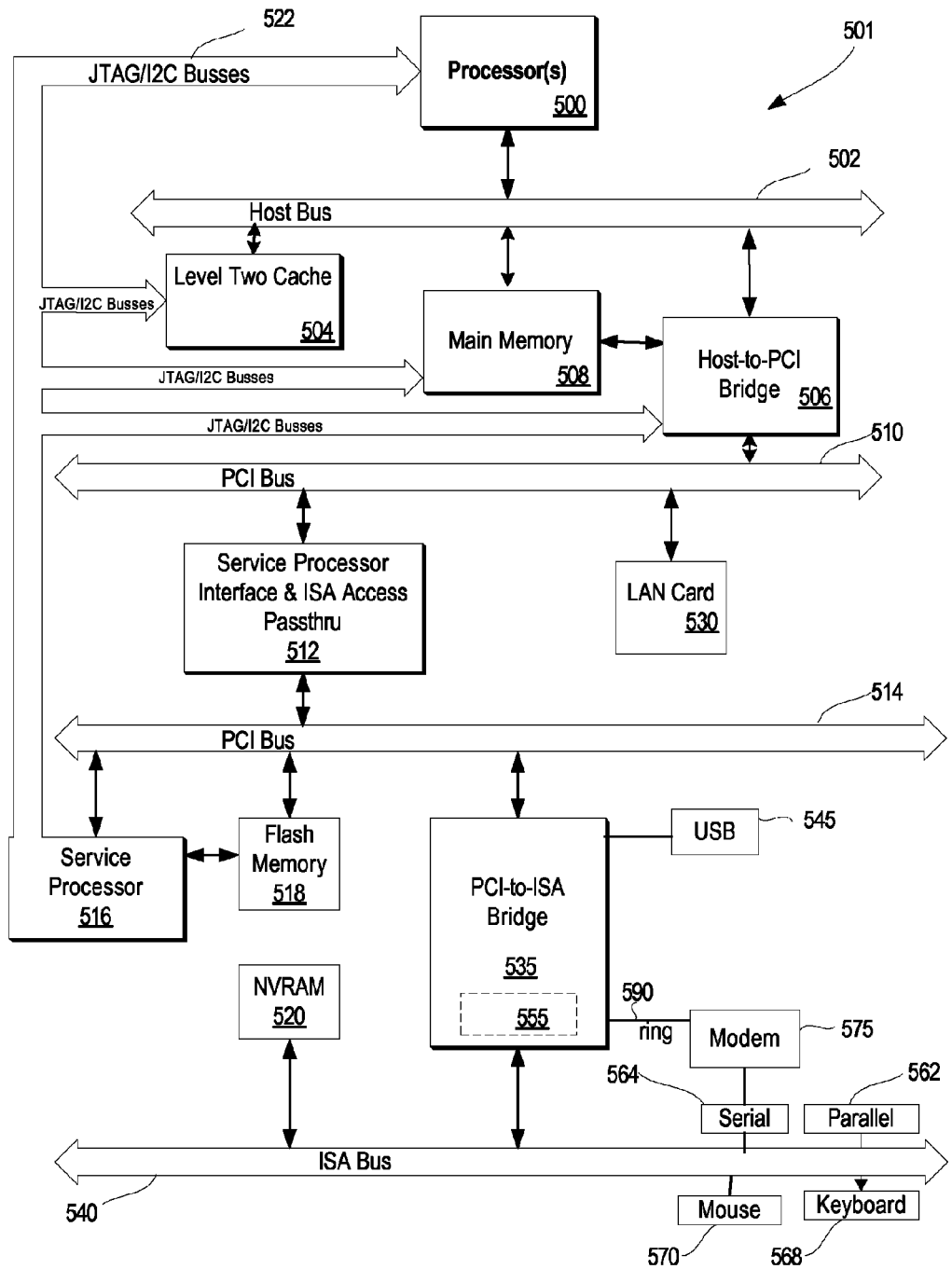
FIG. 5 illustrates an information handling system which is a simplified example of a computer system capable of performing the computing operations described herein.

FIG. 5 illustrates information handling system 501, which is a simplified example of a computer system capable of performing the computing operations described herein. Computer system 501 includes processor 500, which is coupled to host bus 502. A level two (L2) cache memory 504 is also coupled to host bus 502. Host-to-PCI bridge 506 is coupled to main memory 508, includes cache memory and main memory control functions, and provides bus control to handle transfers among PCI bus 510, processor 500, L2 cache 504, main memory 508, and host bus 502. Main memory 508 is coupled to Host-to-PCI bridge 506 as well as host bus 502. Devices used solely by host processor(s) 500, such as LAN card 530, are coupled to PCI bus 510. Service Processor Interface and ISA Access Pass-through 512 provides an interface between PCI bus 510 and PCI bus 514. In this manner, PCI bus 514 is insulated from PCI bus 510. Devices, such as flash memory 518, are coupled to PCI bus 514. In one implementation, flash memory 518 includes BIOS code that incorporates the necessary processor executable code for a variety of low-level system functions and system boot functions.

PCI bus 514 provides an interface for a variety of devices that are shared by host processor(s) 500 and Service Processor 516 including, for example, flash memory 518. PCI-to-ISA bridge 535 provides bus control to handle transfers between PCI bus 514 and ISA bus 540, universal serial bus (USB) functionality 545, power management functionality 555, and can include other functional elements not shown, such as a real-time clock (RTC), DMA control, interrupt support, and system management bus support. Nonvolatile RAM 520 is attached to ISA Bus 540. Service Processor 516 includes JTAG and I2C busses 522 for communication with processor(s) 500 during initialization steps. JTAG/I2C busses 522 are also coupled to L2 cache 504, Host-to-PCI bridge 506, and main memory 508 providing a communications path between the processor, the Service Processor, the L2 cache, the Host-to-PCI bridge, and the main memory. Service Processor 516 also has access to system power resources for powering down information handling device 501.

Peripheral devices and input/output (I/O) devices can be attached to various interfaces (e.g., parallel interface 562, serial interface 564, keyboard interface 568, and mouse interface 570 coupled to ISA bus 540. Alternatively, many I/O devices can be accommodated by a super I/O controller (not shown) attached to ISA bus 540.

In order to attach computer system 501 to another computer system to copy files over a network, LAN card 530 is coupled to PCI bus 510. Similarly, to connect computer system 501 to an ISP to connect to the Internet using a telephone line connection, modem 575 is connected to serial port 564 and PCI-to-ISA Bridge 535.

While the computer system described in FIG. 5 is capable of executing the processes described herein, this computer system is simply one example of a computer system. Those skilled in the art will appreciate that many other computer system designs are capable of performing the processes described herein.

One of the preferred implementations of the invention is a client application, namely, a set of commands (program code) in a code module that may, for example, be resident in the random access memory of the computer. Until required by the computer, the set of commands may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
   one or more processors;
   a memory accessible by the processors;
   one or more nonvolatile storage devices accessible from the processors;
   a text file stored on one of the nonvolatile storage devices;
   a component placement tool which processes a plurality of hardware component identifiers stored in the text file, the component placement tool being effective to:
      read, from the text file, the plurality of hardware component identifiers;
      assign a plurality of component instances to a data structure stored in the memory, wherein the component instances correspond to the hardware component identifiers and wherein component instances in the data structure include a column identifier and a row identifier;
      retrieve a width and a height corresponding to the hardware component identifier from a component library stored on one of the nonvolatile storage devices;
      organize hardware components included in the data structure in a hardware graphics layout based upon the column and row identifier of the components and based upon the width and height of the components, wherein the hardware graphics layout is adapted to be read by a visual hardware circuit design tool;
      position a first plurality of components in a first row, wherein each of the first plurality of components is placed horizontally adjacent to one another;
      position a second plurality of components in a second row, wherein the second row is oriented horizontally above the first row at a position greater than the component in the first plurality of components with the greatest height, where each of the second plurality is also placed horizontally adjacent to one another;
      read an initialize command from the text file and a large component to be placed after the initialize command is processed; and
      in response to the initialize command:
         place the large component at a position where the bottom edge of the large component is the same as the bottom edge of the first row of components, the left edge of the large component is to the right of the last components in the first and second rows, and the height of the large component is greater than all of the first plurality of components.

2. The information handling system of claim 1, wherein the component placement tool is further effective to:
   assign one or more additional parameters to each of the plurality of components and storing the additional parameters in the data structure, wherein the additional parameters are selected from the group consisting of an orientation, an offset, and a priority.

3. The information handling system of claim 1, wherein the component placement tool is further effective to:
   identify the component with the largest height in the first row, wherein the placing of components in a second row begin at a height greater than the largest height identified in the first row.

4. The information handling system of claim 1, wherein the component placement tool is further effective to:
   position a first plurality of components in a first row, wherein each of the first plurality of components is placed horizontally adjacent to one another; and
   position a second plurality of components in a second row, wherein the second row is oriented horizontally above the first row at a position greater than the component in the first plurality of components with the greatest height, where each of the second plurality is also placed horizontally adjacent to one another.

5. A computer program product comprising a non-transitory computer operable medium having computer readable code, the computer readable code when executed by a computer, enabling the computer to:
   read, from a text file, the plurality of hardware component identifiers;
   assign a plurality of component instances to a data structure stored in a memory, wherein the component instances correspond to the hardware component identifiers and wherein component instances in the data structure include a column identifier and a row identifier;
   retrieve a width and a height corresponding to the hardware component identifiers;

organize hardware components included in the data structure in a hardware graphics layout based upon the column and row identifier of the components and based upon the width and height of the components, wherein the hardware graphics layout is adapted to be read by a visual hardware circuit design tool;

position a first plurality of components in a first row, wherein each of the first plurality of components is placed horizontally adjacent to one another;

position a second plurality of components in a second row, wherein the second row is oriented horizontally above the first row at a position greater than the component in the first plurality of components with the greatest height, where each of the second plurality is also placed horizontally adjacent to one another;

read an initialize command from the text file and a large component to be placed after the initialize command is processed; and in response to the initialize command:
place the large component at a position where the bottom edge of the large component is the same as the bottom edge of the first row of components, the left edge of the large component is to the right of the last components in the first and second rows, and the height of the large component is greater than all of the first plurality of components.

6. The computer program product of claim 5, wherein the computer readable code is further effective to:
assign one or more additional parameters to each of the plurality of components and storing the additional parameters in the data structure, wherein the additional parameters are selected from the group consisting of an orientation, an offset, and a priority.

7. The computer program product of claim 5, wherein the computer readable code is further effective to:
identify the component with the largest height in the first row, wherein the placing of components in a second row begin at a height greater than the largest height identified in the first row.

8. The computer program product of claim 5 wherein the width and height of each component are retrieved from a component library.

* * * * *